Patented June 30, 1942

2,288,566

UNITED STATES PATENT OFFICE 2,288,566

PROCESS OF PRODUCING ACRYLIC ACID AND ITS SALTS

Karl M. Herstein, New York, N. Y., assignor to Acrolein Corporation, a corporation of Delaware No Drawing. Application April 11, 1940, Serial No. 329,034

14 Claims. (Cl. 260—530)

This invention relates to the production of acrylic acid and acrylic acid salts. The invention provides a new process by which acrylic acid and its salts may be advantageously produced by the oxidation of acrolein.

In accordance with the invention acrolein is oxidized to acrylic acid by means of oxygen, the reaction being carried out in an alkaline liquid containing a catalyst containing silver. The process results first in the production of a salt of acrylic acid from which acrylic acid may be produced by treating the salts in a suitable manner, e. g., by acidification. The liberated acrylic acid may then be recovered by steam distillation or any other suitable method. The yield of acrylic acid produced by the new process is very good and amounts to about 80–90% of the yield theoretically obtainable.

The catalyst advantageously used in practicing the new process is one containing silver advantageously in the form of silver oxide. The catalyst may be prepared in any suitable manner, for example, a soluble silver salt such as silver nitrate may be dissolved in water and treated with a suitable basic material such as sodium hydroxide. The resulting precipitate of silver oxide, after thorough washing, is then ready to be used in the process.

In practicing the new process, the silver oxide is suspended in a suitable quantity of water and then treated with an alkaline material. Acrolein and oxygen are then passed into the resulting alkaline liquid and under proper conditions the acrolein will be oxidized to acrylic acid which, due to the alkalinity of the liquid, will be present in the form of a salt of the acid. The salt may be recovered as such from the reaction mixture; or if desired, it may be converted into acrylic acid by acidification or other suitable treatment and the acid then recovered, e. g., by distillation.

The silver oxide suspension is advantageously made alkaline by introducing therein an oxide or hydroxide of an alkaline earth metal such as calcium or magnesium. These compounds are advantageously admixed with the suspension prior to the introduction of acrolein and oxygen therein.

The suspension of silver oxide may also advantageously be rendered alkaline by means of alkali metal oxides or hydroxides such as those of sodium or potassium. These compounds are advantageously used in conjunction with a substance having a buffering action such as, for example, sodium bicarbonate, di-sodium phosphate, etc. One of the latter compounds is advantageously admixed with the silver oxide suspension prior to the introduction of acrolein therein. The alkali metal hydroxide, advantageously in the form of a 20% to 50% aqueous solution, is then slowly added to the reaction liquid simultaneously with the introduction of acrolein therein, the rate of addition being such that the amount of hydroxide added is not substantially greater than that required to neutralize the acrylic acid formed by the oxidation of the acrolein.

To effect the oxidation of the acrolein pure oxygen or air or any other suitable oxygen-containing gas may be used.

The acrolein may be brought into contact with the alkaline liquid containing the catalyst in any suitable manner. Advantageously it is mixed with the stream of oxygen or oxygen-containing gas and then introduced with this gas stream into the alkaline reaction medium, although it may also be introduced independently of the oxygen or oxygen-containing gas. The acrolein and oxygen are advantageously added at a rate such that no substantial concentration of free acrolein is present in the alkaline medium. In general, the reaction is carried out most effectively when the acrolein is converted into acrylic acid almost immediately after its addition to the alkaline reaction liquid.

The temperature of the alkaline medium is advantageously maintained at about 50°–60° C. during the addition of the oxygen and acrolein thereto. The reaction is somewhat exothermic in character and cooling may be necessary to maintain the temperature within the limits just referred to. It is therefore desirable to have a reaction vessel which is equipped with cooling coils so that too high a temperature in the reaction vessel can be avoided. Suitable means for heating the reaction vessel should also be available to bring the reaction liquid up to a temperature of about 50° C.

The alkaline reaction liquid containing the silver oxide suspended therein should be vigorously stirred or otherwise agitated during the addition of oxygen and acrolein thereto. The reaction appears to proceed most effectively when there is intimate contact between the oxygen gas, the acrolein, and the alkaline reaction liquid containing the catalyst. To promote vigorous agitation of the alkaline liquid it is advantageous to bubble the oxygen up through the liquid.

All or a part of the silver oxide suspended in the alkaline reaction liquid may be reduced by the acrolein with which it comes into contact. Under such circumstances there may be a substantial quantity of finely divided metallic silver dispersed in the reaction liquid. Such reduced silver may be active as a catalyst or promoter in the process. The expression "a catalyst containing silver" as used in the specification and claims is intended to cover, without being limited thereto, a catalyst consisting of silver oxide or of finely divided metallic silver which may be produced in the new process by reduction of silver oxide by acrolein.

The invention will be further illustrated by reference to the following examples, it being understood that the invention is not intended to be limited thereto:

Example 1

About 96 grams of silver nitrate are dissolved in about 500 cc. of water. About 200 cc. of a 10% sodium hydroxide solution are then added to the silver nitrate solution. The resulting precipitate of silver oxide is washed with warm water until the wash water shows no test for nitrates.

The washed silver oxide is suspended in about three liters of water together with about 100 grams of magnesium oxide. The resulting composition is then heated to about 50° C. A stream of oxygen gas which has first been bubbled through liquid acrolein at about 20° C. is then passed into the heated alkaline reaction liquid at the rate of about 50 liters per hour. The amount of acrolein entrained in the oxygen stream and introduced into the alkaline reaction liquid after about three hours is about 200 grams. At the end of this period approximately 210 grams of acrylic acid in the form of magnesium acrylate will be present in the alkaline reaction liquid. This corresponds to a yield of about 83% of the theoretical. The reaction is somewhat exothermic and cooling may be necessary to keep it at a temperature of about 50° C.

The magnesium salt is soluble in the reaction liquid and it may be recovered therefrom as such by any suitable means, e. g., by crystallization after filtering off the insoluble constituents of the liquid.

To produce acrylic acid the reaction liquid is filtered to remove the silver oxide and other insoluble materials contained therein. The filtrate is then acidified with phosphoric acid until the pH of the solution is about 2. The free acrylic acid in the liquid is then recovered by steam distillation.

Example 2

Silver oxide prepared from about 96 grams of silver nitrate and suspended in about three liters of water as in Example 1, has admixed with it about 600 grams of hydrated lime. The resulting alkaline composition is heated to a temperature of about 50°–60° C., and a stream of oxygen gas which has been bubbled through acrolein at about 20° C. is then introduced therein at the rate of about 100 liters per hour. The stream of oxygen containing entrained acrolein is bubbled through the alkaline reaction liquid until about 450 grams of acrolein have been introduced into the reaction liquid. At the end of this time about 506 grams of acrylic acid in the form of the calcium salt will have been produced. This corresponds to a yield of about 87% of the theoretical.

The calcium acrylate is soluble in the reaction liquid and may be recovered as such or converted into acrylic acid by the procedure set forth in Example 1.

Example 3

About 96 grams of silver nitrate are converted into silver oxide by the procedure described in Example 1, and then suspended in about two and one-half liters of water. About 50 grams of sodium bicarbonate are then added to the suspension. The alkaline reaction mixture is then heated to about 55° C. and a stream of oxygen which has been bubbled through liquid acrolein is then introduced into the reaction liquid at the rate of about 50 liters per hour. A 50% aqueous sodium hydroxide solution is slowly and more or less continuously added to the reaction liquid simultanously with the introduction of the acrolein, the rate of addition of the solution being such that the amount of sodium hydroxide introduced into the reaction liquid is just sufficient to neutralize the acrylic acid formed by the oxidation of the acrolein. At the end of about two and one-half to three hours approximately 200 grams of acrolein will have been introduced into the reaction liquid. About 230 grams of acrylic acid in the form of sodium acrylate are produced. This corresponds to a yield of about 84% of the theoretical.

The sodium acrylate is soluble in the reaction liquid and may be recovered as such or converted into acrylic acid by the procedure set forth in Example 1.

Instead of phosphoric acid other suitable acids, e. g., sulfuric acid, may be used to liberate acrylic acid from its salts. The acidified acrylic acid salt solution need not necessarily have a pH of 2 but may be acidified to any degree which enables efficient recovery of acrylic acid to be achieved.

Instead of bubbling the oxygen or an oxygen-containing gas through liquid acrolein in order to carry acrolein into the alkaline reaction medium, the acrolein may be injected into the oxygen stream by allowing it to drip at a suitable rate into the stream of gas. The acrolein may also be introduced directly into the alkaline liquid without prior admixture with the oxygen.

The silver oxide in the alkaline reaction liquid after the conversion of acrolein into acrylic acid has been completed may be recovered from the reaction liquid, thoroughly washed and, after resuspension in a suitable quantity of water and treatment with an alkaline material, may be reused in the process. If the re-suspended silver oxide in this form is not properly active it may, of course, be dissolved with an acid such as nitric acid and then re-precipitated by the procedure outlined in Example 1.

I claim:

1. The process of producing alkaline earth salts of acrylic acid which comprises subjecting acrolein to the action of oxygen in a liquid containing an alkaline earth hydroxide and catalytic quantities of a catalyst containing silver as an essential ingredient.

2. The process of producing alkali metal salts of acrylic acid which comprises subjecting acrolein to the action of oxygen in a liquid containing an alkali metal hydroxide and catalytic quantities of a catalyst containing silver as an essential ingredient.

3. The process of producing calcium acrylate which comprises subjecting acrolein to the action of oxygen in a liquid containing calcium hydroxide and catalytic quantities of a catalyst containing silver as an essential ingredient.

4. The process of producing magnesium acrylate which comprises subjecting acrolein to the action of oxygen in a liquid containing magnesium hydroxide and catalytic quantities of a catalyst containing silver as an essential ingredient.

5. The process of producing sodium acrylate which comprises subjecting acrolein to the action of oxygen in a liquid containing sodium hydroxide and catalytic quantities of a catalyst containing silver as an essential ingredient.

6. The process of producing acrylic acid which comprises subjecting acrolein to the action of oxygen in a liquid containing an alkaline earth hydroxide and catalytic quantities of a catalyst containing silver as an essential ingredient, and then converting the resulting alkaline earth salt of acrylic acid into acrylic acid.

7. The process of producing acrylic acid which comprises subjecting acrolein to the action of oxygen in a liquid containing an alkali metal hydroxide and catalytic quantities of a catalyst containing silver as an essential ingredient, and then converting the resulting alkali metal salt of acrylic acid into acrylic acid.

8. The process of producing acrylic acid which comprises subjecting acrolein to the action of oxygen in a liquid containing calcium hydroxide and catalytic quantities of a catalyst containing silver as an essential ingredient, and then converting the resulting calcium salt of acrylic acid into acrylic acid.

9. The process of producing acrylic acid which comprises subjecting acrolein to the action of oxygen in a liquid containing magnesium hydroxide and catalytic quantities of a catalyst containing silver as an essential ingredient, and then converting the resulting magnesium salt of acrylic acid into acrylic acid.

10. The process of producing acrylic acid which comprises subjecting acrolein to the action of oxygen in a liquid containing sodium hydroxide and catalytic quantities of a catalyst containing silver as an essential ingredient, and then converting the resulting sodium salt of acrylic acid into acrylic acid.

11. The process of producing acrylic acid which comprises subjecting acrolein to the action of oxygen in an aqueous alkaline solution of a compound which in said solution produces ions of the group consisting of alkali and alkaline earth metal ions, said solution also containing catalytic quantities of a catalyst containing silver as an essential ingredient, and thereafter converting the resulting salt of acrylic acid into acrylic acid.

12. The process of producing acrylic acid which comprises subjecting acrolein to the action of oxygen in an aqueous alkaline solution of a compound which in said solution produces ions of the group consisting of alkali and alkaline earth metal ions, said solution also containing catalytic quantities of a catalyst containing silver as an essential ingredient, acidifying the resulting salt of acrylic acid to produce acrylic acid and then recovering the acrylic acid produced.

13. The process of producing acrylic acid which comprises subjecting acrolein to the action of oxygen in an aqueous alkaline solution of a compound which in said solution produces ions of the group consisting of alkali and alkaline earth metal ions, said solution also containing catalytic quantities of a catalyst containing silver as an essential ingredient, filtering the resulting reaction liquid to remove insoluble constituents therefrom, acidifying the filtrate to produce acrylic acid and then recovering the acrylic acid produced.

14. The process of producing salts of acrylic acid which comprises subjecting acrolein to the action of oxygen in an aqueous alkaline solution of a compound which in said solution produces ions of the group consisting of alkali and alkaline earth metal ions, said solution also containing catalytic quantities of a catalyst containing silver as an essential ingredient.

KARL M. HERSTEIN.